United States Patent [19]

McCoy

[11] 4,382,853
[45] May 10, 1983

[54] DEMULSIFICATION OF BITUMEN EMULSIONS USING COMBINATIONS OF CHEMICAL AGENTS

[75] Inventor: David R. McCoy, Austin, Tex.

[73] Assignee: Texaco Inc., White Plains, N.Y.

[21] Appl. No.: 326,464

[22] Filed: Dec. 2, 1981

[51] Int. Cl.³ .................. C10G 33/04; C09K 3/00; C30B 3/00
[52] U.S. Cl. .................. 208/188; 252/338; 210/708; 210/728; 210/732; 210/734; 210/737
[58] Field of Search .................. 208/188; 252/358; 210/708, 728, 732, 734, 737

[56] References Cited

U.S. PATENT DOCUMENTS

| | | | |
|---|---|---|---|
| 3,658,718 | 4/1972 | Clumpner | 252/358 |
| 3,880,752 | 4/1975 | Premo | 208/188 |
| 3,956,117 | 5/1976 | Bradley et al. | 252/358 |
| 4,267,120 | 5/1981 | Cuscurida et al. | 528/297 |
| 4,321,146 | 3/1982 | McCoy et al. | 210/708 |
| 4,321,147 | 3/1982 | McCoy et al. | 208/188 |

Primary Examiner—Delbert E. Gantz
Assistant Examiner—Helane E. Maull
Attorney, Agent, or Firm—Jack H. Park; Kenneth R. Priem; David L. Mossman

[57] ABSTRACT

A process for recovering bitumen from oil-in-water (O/W) emulsions is disclosed wherein water soluble demulsifiers are used. These demulsifiers are combinations of chemical agents comprising
(a) poly(amidoamine) or poly(ester-amine) salts, and
(b) polycarbonates.

To resolve the bituminous petroleum emulsions, the process is carried out between 25° and 160° C. wherein the demulsifier of the invention is contacted with the bituminous emulsion.

8 Claims, No Drawings

DEMULSIFICATION OF BITUMEN EMULSIONS USING COMBINATIONS OF CHEMICAL AGENTS

BACKGROUND OF THE INVENTION

1. Field of the Invention

This invention is concerned with the breaking or resolution of oil-in-water (O/W) bituminous emulsions by treatment with chemical agents.

2. Description of Related Art

A great volume of hydrocarbons exist in known deposits of tar sands. These deposits occur at various places, the Athabasca tar sands in Canada being an example. The petroleum in a tar sand deposit is an asphaltic bitumen of a highly viscous nature ranging from a liquid to a semi-solid. These bituminous hydrocarbons are usually characterized by being very viscous or even non-flowable under reservoir conditions by the application of driving fluid pressure.

Where surface mining is not feasible, the bitumen must be recovered by rendering the tar material mobile in situ and producing it through a well penetrating the tar sand deposit. These in-situ methods of recovery include thermal, both steam and in-situ combustion and solvent techniques. Where steam or hot water methods are used, a problem results which aggravates the recovery of the bitumen. The difficulty encountered is emulsions produced by the in-situ operations. These emulsions are highly stable O/W emulsions which are made even more stable by the usual presence of clays. Most *liquid* petroleum emulsions are water-in-oil (W/O) types. These normal W/O emulsions are broken by methods known in the art. However, the bitumen emulsions which are O/W types present a much different problem, and the same demulsifiers used in W/O emulsions will not resolve the O/W bitumen emulsions.

C. W. W. Gewers, *J. Canad. Petrol. Tech.*, 7 (2), 85–90 (1968) describes the uniqueness of emulsions encountered in the production of bitumen from tar sands.

Ser. No. 326,461 filed of even date describes the use of polyamine salts which are one component of the combination of chemical agents found useful in this invention.

A review article on the preparation and structure of polycarbonates is S. Inoue, *Chem. Tech.*, September 1976, p. 588.

U.S. Pat. No. 4,267,120 (Texaco) describes preparation of one type of polycarbonate of interest.

SUMMARY OF THE INVENTION

The invention is a method for recovering petroleum from O/W bitumen emulsions by resolving or breaking these emulsions by contacting the emulsions at a temperature of from between about 25° and 160° C. with a combination of chemical agents comprising (a) salts of polymers and/or co-polymers of cationic monomers having the general structure

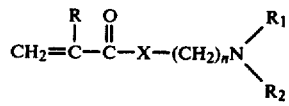

where R=H or lower alkyl, X=NH or O, n>1, and $R_1$ and $R_2$ are hydrogen or alkyl and wherein the polymers or co-polymers have a molecular weight greater than about 2,000, and (b) polycarbonates.

DESCRIPTION OF THE PREFERRED EMBODIMENTS

The process of this invention utilizing the chemical demulsifier as described above utilizes as a chemical demulsifier a particular combination of chemical agents.

Especially useful and preferred in this process are combinations of chemical agents mentioned in the Summary of the Invention wherein component (a) has R=H or lower alkyl, preferably $CH_3$, X=NH or —O—, n>1, preferably 2 to 3, and $R_1$ and $R_2$=hydrogen or alkyl, preferably $CH_3$. Component (a) may be a co-polymer which must have the above monomer of component (a) present in greater than 50 wt. % of the total co-polymer composition, preferably greater than 80 wt. %. The co-polymers of component (a) may be formed using as the co-polymeric material acrylamide, styrene, methacrylate esters, vinyl acetate, vinyl chloride, vinyl pyrrolidine, etc.

The monomers of component (a) may also be formed into homopolymers.

The salt is formed by the addition of enough inorganic or organic acid to the polymers or co-polymers to render a 1 wt. % aqueous solution to a pH of less than 8 and preferably less than 7.

Component (b) is a polycarbonate. These polycarbonates are prepared by the co-polymerization of carbon dioxide or alkylene carbonates, preferably ethylene carbonates, with polyols, alkylene oxides (preferably ethylene oxide), and/or carboxylic acid anhydrides.

The weight ratio of component (a) to component (b) should be in the range of 0.5:1 to 1.0:0.5. Preferably the ratio of the two chemical agents should be close to 1:1.

As the following data will show, there is substantial improvement in the oil quality obtained by addition of a polycarbonate [component (b)] to the salt of the cationic monomer [component (a)] over treating a bitumen emulsion with component (a) alone. This is surprising in view of the fact that the polycarbonate alone is virtually inactive in breaking bitumen emulsions.

The produced bitumen emulsions may be treated by the process of our invention in a conventional manner, for example, in a conventional horizontal treater operated, for example, from about 25° to 160° C. and, preferably, from about 50°–150° C. at autogenous pressures. The total concentration of the chemical demulsifiers described above used in treating the bitumen in water emulsions may range from about 1 to 200 parts per million and, preferably, from about 30 to 150 parts per million with the optional addition of an organic diluent and/or inorganic salt as well as standard flocculants and mechanical or electrical means of demulsification. The following examples describe more fully the present process. However, these examples are given for illustration and are not intended to limit the invention.

In one preferred embodiment of this invention the components (a) and (b) are added to the bitumen emulsion at different times. The emulsion is first thoroughly contacted with either one of the two chemical components and allowed to stand for a period of time before addition of the second chemical component. Such sequential addition shows certain performance advantages over simultaneous addition of both chemical treating agents.

EXAMPLE I

Cationic Polymers (a) To a one-liter resin kettle were charged 247 g DMAPMA*, 250 g isopropanol and 1.0 cc of a solution of 17.9% 2,2'-Azobis(2,4-dimethylvaleronitrile) in toluene. The resulting solution was deoxygenated for 65 minutes by bubbling nitrogen through at a rate of 14 liters/hour. The nitrogen padded solution was then heated first at 45° C., then the temperature was elevated to 88° C. over 2.5 hours. After 0.5 hour of heating, 3.5 cc of the initiator solution was added; after 1.0 hour of heating, 5.0 cc was added; and after 1.5 hour, 5.0 cc more was added to a total of 14.5 cc initiator solution.
*DMAPMA = dimethylaminopropylmethacrylamide,

The resulting solution (270 g) was evaporated to 140 g with a pump vacuum of ca. 2 mm Hg and a boiling water bath. The solid residue was treated at −78° C., then chipped from the evaporation flask to give a yellowish, glassy solid.

Molecular weight was determined by size exclusion liquid chromatography on a Toya Soda 3,000 P.W. column using as a solvent 0.8 M trishydroxymethylaminomethane adjusted to pH 7. Using polyethylene glycol molecular weight standards, the weight average molecular weight of the polymer was 58,000.

One gram of the solid polymer was dissolved in 99 g deionized water and enough concentrated sulfuric acid added to give a solution pH of 6.5.

(b) In an experiment similar to Example I, the following were charged to the reactor: 500 g DMAPMA, 500 g deionized water, 1.0 g 2,2'-Azobis(2-amidinopropane)hydrochloride and 0.05 g sodium salicylate. Deoxygenation was accomplished by nitrogen stream for 70 minutes. The reaction mixture was heated first at 55° C. for 4.3 hours, then the temperature was increased to 80° C. and held at temperature for 6.7 hours.

Conversion of the monomer was 89% complete and a polymer resulted which had a molecular weight of ca. 1.5 million by size exclusion liquid chromatography using polyacrylamide standards. The solvent used was 0.1 N nitric acid; the column material was 1,000 angstrom silica coated with alkyl amine groups.

Enough concentrated hydrochloric acid was added to a 1 wt. % aqueous solution to render it pH 7.

(c) A MAPTAC* polymer was prepared as follows: to a one-liter glass reactor were charged 200 g MAPTAC (50% solids, 50% water), 134 g deionized water, 0.1 g sodium salicylate and 0.5 g 2,2'-Azobis(2-amidinopropane)hydrochloride. The reactor contents were deoxygenated by passing a stream of nitrogen through for one hour at the rate of 14 liters/hour. The nitrogen padded reactor was then heated for 5.7 hours at 50° C.
*MAPTAC = methacrylamidopropyltrimethylammonium chloride

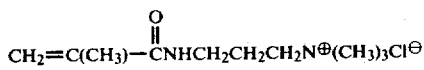

The viscosity of a 0.5% solution of the resulting polymer in water was 8.6 cp. Monomer conversion was 98%. (Viscosity was measured with the Nameter Vibrating Sphere Viscometer at 25° C.).

EXAMPLE II

Polycarbonates (a) An autoclave was charged with 0.4 pounds of ethylene glycol, 0.97 pounds phthalic anhydride, and 8.62 pounds of ethylene carbonate with 9.1 g $K_2SnO_3$ catalyst. The mixture was digested at 150°–186° C. for 2 hours with pressure kept at 50 psig by releasing excess periodically. Polycarbonate product had a hydroxyl number of 222 and a molecular weight of 455 by liquid chromatography.

(b) A mixture of 1,000 parts polycarbonate from $CO_2$ and poly(oxyethylene)glycol-400 (hydroxyl number = 103), 1800 parts ethylene oxide, 900 parts carbon dioxide, and 6.8 parts $K_2SnO_3$ was digested for 3.75 hours at 170°–178° at 1,425 psig maximum to obtain a polycarbonate with 22.1% $CO_2$ incorporated and a hydroxyl number of 42.

(c) The method of IIb was used with glycerol 3-mole ethoxylate in place of PEG-400 polycarbonate to prepare a polycarbonate containing a $CO_2$:EO mole ratio of 1:6.7 and having a hydroxyl number of 249.

EXAMPLE III

Polyols

For comparative purposes, the following polyols were investigated:

(a) A 3,000 molecular weight propylene oxide adduct of glycerol.

(b) A 6,500 molecular weight polyol prepared by addition of a propylene oxide:ethylene oxide mixture to glycerol followed by reaction with 20 wt. % ethylene oxide (25% EO in final product).

(c) A 10,000 molecular weight diol prepared from a mixture of 75 wt. % ethylene oxide:25 wt. % propylene oxide.

EXAMPLE IV

Polyamine Salt

Enough 60,000 molecular weight poly(ethyleneimine) and concentrated HCl were added to deionized water to prepare a 1% solution with pH 6.4.

EXAMPLE V

Demusifier Bottle Tests

The following basic testing procedure was employed:

(a) A 1 wt. % solution (on an amines charged basis where aminopolymers were used, rather than on an amines salts basis) of each chemical was prepared (in water or acetone).

(b) A 30 ml PYREX ® test tube equipped with screw top was charged with 23 ml emulsion of 11.5 wt. % bitumen content obtained by in-situ steam flooding in tar sand pattern located at Ft. McMurray, Alberta, Canada.

(c) 2 ml Wizard Lake crude oil was added as diluent and the contents of the test tube were mixed.

(d) The contents of the test tube were equilibrated in a 80° C. over for 1-2 hours and mixed again.

(e) Chemical was added to the hot, dilute emulsion at the following concentrations: 30, 60, 120 ppm.

(f) Contents of the test tubes were mixed, re-equilibrated in an oven at 80° C. for 1 hour and mixed again.

(g) In some cases a second chemical treating agent was added at this point and contents of the test tube thoroughly mixed.

(h) After 20 hours of standing at 80° C., measurements were made on the volume of top and middle layers, and the appearance of the aqueous phase was noted. Samples of some top layers were carefully removed by pipetting and subjected to Karl-Fischer analysis for determination of the water content. pH mea- In all examples, comparative data utilizing no demulsifiers or only one of the two-component systems are given. The polycarbonates are seen to be virtually inactive when used alone, and definite improvement over use of DMAPMA polymer alone is seen with the polycarbonate/DMAPMA polymer systems.

DEMULSIFIER TESTING

| Example V | Candidate Demulsifier | Concentration (ppm) | Oil Phase Volume in ml. | (% $H_2O$) | Emulsion Phase Volume in ml. (% $H_2O$) | Aqueous Phase Appearance |
|---|---|---|---|---|---|---|
| a | Product of Ex. IIa | 60 | 2 | | 2 | Muddy |
| b | Product of Ex. Ia | 60 | 9.5 | (48) | 0 | Light, muddy |
| c | Product of Ex. Ic | 60 | 9.5 | (0.5) | 0 | Yellow, clear |
| d (1) | Product of Ex. IIa/ | 60/ | 8 | (0.5) | 0 | Yellow, clear |
| (2) | Product of Ex. Ia/ | 60 | | | | |
| e (1) | Product of Ex. IIa/ | 60/ | 8.5 | (0.6) | 0 | Yellow, clear |
| (2) | Product of Ex. Ic | 60 | | | | |
| f | None | — | 2.5 | | 1.5 | Muddy |
| g | Product of Ex. Ib | 60 | 8 | (55) | 0 | Yellow, clear |
| h (1) | Product of Ex. IIa/ | 30/ | 7.5 | (24) | 0.5 | Yellow, clear |
| (2) | Product of Ex. Ib | 60 | | | | |
| i (1) | Product of Ex. IIa/ | 60/ | 7 | (19) | 0 | Yellow, clear |
| (2) | Product of Ex. Ib | 60 | | | | |
| j (1) | Product of Ex. IIc/ | 60/ | 7.5 | (33) | 0 | Yellow, clear |
| (2) | Product of Ex. Ib | 60 | | | | |
| k (1) | Product of Ex. IIb/ | 60/ | 9 | (40) | 0 | Light yellow, clear |
| (2) | Product of Ex. Ib | 60 | | | | |
| l (1) | Product of Ex. Ib/ | 60 | 8.5 | (28) | 0 | Colorless, clear |
| (2) | Product of Ex. IIa | 60 | | | | |
| m | Product of Ex. Ic | 60 | 9.5 | (54) | 0 | Yellow, clear |
| n (1) | Product of Ex. IIc/ | 60/ | 9.5 | (52) | 0 | Yellow, cloudy |
| (2) | Product of Ex. Ic | 60 | | | | |
| o | Product of Ex. IV | 60 | 7.5 | (30) | 0 | Yellow, clear |
| p (1) | Product of Ex. IV/ | 60 | 9 | (44) | 0 | Yellow, clear |
| (2) | Product of Ex. IIa | 60 | | | | |
| q (1) | Product of Ex. IIa/ | 60 | 9 | (58) | 0 | Brown, translucent |
| (2) | Product of Ex. IV | 60 | | | | |
| r (1) | Product of Ex. IIc/ | 60/ | 9.5 | (48) | 0 | Colorless, clear |
| (2) | Product of Ex. IV | 60 | | | | |
| s | None | — | 1.25 | | 4 | Muddy |
| t | Product of Ex. IIc | 60 | 2 | | 3 | Dark, translucent |
| u | Product of Ex. IIb | 60 | 2.5 | | 2 | Muddy |
| v | Product of Ex. Ib | 60 | 9 | (27) | 0 | Yellow, clear |
| w (1) | Product of Ex. IIa/ | 120/ | 5.5 | (44) | 3 | Translucent |
| (2) | Product of Ex. Ib | 60 | | | | |
| x (1) | Product of Ex. IIIa/ | 60/ | 9.5 | (37) | 0 | Yellow, clear |
| (2) | Product of Ex. Ib | 60 | | | | |
| y (1) | Product of Ex. IIIb/ | 60 | 5 | (41) | 0.75 | Translucent |
| (2) | Product of Ex. Ib | 60 | | | | |
| z (1) | Product of Ex. IIIc/ | | 7 | (29) | 0 | Yellow, clear |
| (2) | Product of Ex. Ib | | | | | |
| a' | Product of Ex. Ib | 60 | 10 | (47) | 0 | Light yellow, clear |
| b' | Product of Ex. Ib + Product of Ex. IIa (added simultaneously) | 60 + 60 | 7.5 | (32) | 0 | Light yellow, clear | surements were made on the aqueous phases of some broken emulsions to confirm that the addition of even highly acidic demulsifier solutions in the small quantities used have little effect on lowering the pH from the initially observed emulsion pH of 7.8.

Results from the tests are summarized in the attached table. Example Vd represents the first reduction to practice. Examples e, n, p, q and r are negative examples with cationic polymers other than the type specified.

Examples x, y and z are negative examples with replacement of desired polycarbonates by polyols containing 0-75 wt. % ethylene oxide.

The relative advantage to adding both chemical components sequentially instead of simultaneously can be seen by comparing b' to d and l.

The effect of changing the relative weight ratio of polycarbonate to cationic is seen in Examples d, h and w.

We claim:
1. A process for recovering petroleum from O/W bitumen emulsions by demulsifying said emulsions by adding thereto a combination of chemical agents comprising
   (a) Salts of polymers and/or co-polymers of cationic monomers having the general structure

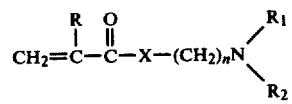

where R=H or lower alkyl, X=NH or O, n>1, and $R_1$ and $R_2$ are hydrogen or alkyl and wherein the polymers or co-polymers have a molecular weight greater than about 2,000 and
   (b) polycarbonates.

2. A process as in claim 1 wherein R=H or $CH_3$, X=NH, n=3 and $R_1$ and $R_2$ are both $CH_3$.

3. A process as in claim 2 wherein R is H.

4. A process as in claim 2 wherein R is $CH_3$.

5. A process as in claim 1 wherein the polycarbonates are made from polyol, alkylene carbonate and carboxylic acid anhydride.

6. A process as in claim 5 wherein the alkylene carbonate is ethylene carbonate.

7. A process as in claim 1 wherein the polycarbonates are made from polyol, ethylene oxide and carbon dioxide.

8. A process as in claim 1 wherein chemical agents (a) and (b) are added to the bitumen emulsion at different times.

* * * * *